United States Patent [19]

Evans et al.

[11] Patent Number: 5,491,029
[45] Date of Patent: Feb. 13, 1996

[54] MAGNETIC RECORDING MEDIUM HAVING A BINDER COMPOSITION COMPRISING PHOSPHONATED POLYURETHANE AND A VINYL CHLORIDE COPOLYMER WITH AMMONIUM FUNCTIONALITIES

[75] Inventors: Christopher M. Evans, Harlow; Colin F. Norman, Bishops Stortford, both of Great Britain

[73] Assignee: Minnesota Mining and Manufacturing Company, St. Paul, Minn.

[21] Appl. No.: 306,992

[22] Filed: Sep. 16, 1994

[30] Foreign Application Priority Data

Oct. 7, 1993 [GB] Great Britain ............... 9320711

[51] Int. Cl.[6] ................................... G11B 5/00
[52] U.S. Cl. ........................ 428/423.1; 428/425.8; 428/425.9; 428/522; 428/694 BU; 428/694 B; 428/694 BL; 428/694 BG; 428/900; 252/62.54; 524/435; 525/131; 528/71
[58] Field of Search ............ 252/62.54; 428/423.1, 428/425.8, 425.9, 522, 694 BU, 694 B, 694 BL, 694 BG, 900; 524/435; 525/131; 528/71

[56] References Cited

U.S. PATENT DOCUMENTS

| | | | |
|---|---|---|---|
| 3,076,010 | 1/1963 | Beck | 260/461 |
| 4,529,661 | 7/1985 | Ninomiya et al. | 428/425.9 |
| 4,612,244 | 9/1986 | Kaneda et al. | 428/323 |
| 4,634,633 | 1/1987 | Ninomiya et al. | 428/425.9 |
| 4,637,959 | 1/1987 | Ninomiya et al. | 428/425.9 |
| 4,784,507 | 11/1988 | Vetter | 402/13 |
| 4,784,914 | 11/1988 | Matsufuji et al. | 428/418 |
| 4,830,923 | 5/1989 | Sumiya et al. | 428/425.9 |
| 4,837,082 | 6/1989 | Harrell et al. | 428/329 |
| 4,842,942 | 6/1989 | Yatsuka et al. | 428/425.9 |
| 5,037,934 | 8/1991 | Yusuda et al. | 528/72 |
| 5,057,373 | 10/1991 | Tokunaga et al. | 428/413 |
| 5,069,807 | 12/1991 | Ohkubo | 252/62.54 |
| 5,071,578 | 12/1991 | Ohkubo et al. | 252/62.54 |
| 5,096,774 | 3/1992 | Sano et al. | 428/323 |
| 5,126,202 | 6/1992 | Inaba et al. | 428/402 |
| 5,151,330 | 9/1992 | Kumamoto et al. | 428/425.9 |
| 5,153,079 | 10/1992 | Sasaki et al. | 428/694 |
| 5,165,999 | 11/1992 | Ushimaro et al. | 428/425.9 |
| 5,250,354 | 10/1993 | Ejiri | 428/336 |
| 5,371,166 | 12/1994 | Farkas et al. | 528/71 |

FOREIGN PATENT DOCUMENTS

| | | |
|---|---|---|
| 2-012613 | 6/1988 | Japan . |
| 1-073523 | 3/1989 | Japan . |
| 1-106324 | 4/1989 | Japan . |
| 2-053219 | 2/1990 | Japan . |
| 2-129217 | 5/1990 | Japan . |
| 3-141018 | 6/1991 | Japan . |
| 3-141618 | 6/1991 | Japan . |
| 3-219417 | 9/1991 | Japan . |
| 3-203020 | 9/1991 | Japan . |
| 3-224128 | 10/1991 | Japan . |
| 3-224129 | 10/1991 | Japan . |
| 3-224130 | 10/1991 | Japan . |

*Primary Examiner*—Stevan A. Resan
*Attorney, Agent, or Firm*—Gary L. Griswold; Walter N. Kirn; David B. Kagan

[57] ABSTRACT

A binder composition suitable for use with magnetic media comprising:

(i) a phosphonated polyurethane having a plurality of units of the formula:

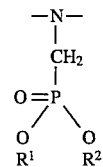

wherein:
the nitrogen atom forms part of the backbone chain of the polymer, and
$R^1$ and $R^2$ independently represent members selected from the group consisting of alkyl groups of 1 to 5 carbon atoms, cycloalkyl groups and aryl groups of 6 to 10 carbon atoms or together $R^1$ and $R^2$ comprise the necessary carbon atoms to complete a ring, and (ii) a vinyl chloride copolymer having pendant ammonium functionalities.

17 Claims, No Drawings

MAGNETIC RECORDING MEDIUM HAVING A BINDER COMPOSITION COMPRISING PHOSPHONATED POLYURETHANE AND A VINYL CHLORIDE COPOLYMER WITH AMMONIUM FUNCTIONALITIES

FIELD OF THE INVENTION

This invention relates to binders for magnetic media and in particular to a binder which comprises a blend of a particular phosphonate functional polyurethane and a hard resin.

BACKGROUND TO THE INVENTION

Magnetic recording is the preferred method of information storage when data must be capable of being read immediately after writing (e.g. in instant replay or for verification), or where the data is to be processed by a machine.

The recording medium usually consists of fine, single domain particles dispersed in a polymeric binder, coated onto a substrate. The desired physical and magnetic properties of the recording layer are often dictated by certain processing parameters. One of these, good pigment wetting is important when ensuring an even distribution of pigment throughout the finished magnetic coating. Good pigment wetting is obtained by selecting suitable dispersing agents whose role is to interact strongly with the pigment surface and to provide stability to the magnetic particles once dispersed. This ensures that the formed dispersion has a prolonged lifetime and that resultant magnetic layer formed from the dispersion has the required physical and magnetic properties.

In general, most dispersions for forming the recording medium contain pigment, binder resins, lubricants and dispersing agents. Of the various resins utilised for magnetic media applications, the most useful are polyurethane resins, vinyl chloride-vinyl acetate copolymers and nitrocellulose and the like. These binder materials are not able to efficiently wet the pigment surface, and so cannot disperse the magnetic particle sufficiently well to enable a medium to be produced with homogeneously dispersed magnetic particles. In such systems it is conventional to add a lower molecular weight dispersing agent such as a soy-bean lecithin or a phosphoric acid derivative to aid in pigment dispersion. Magnetic media containing low molecular weight dispersing agents are prone to interactions which can adversely affect its performance. When such a system is used over a long period of time bleeding of the dispersant can occur which will be detrimental to the durability of the media. In addition the current trend is to use media which have high pigment loadings (typically greater than 75% by weight), of fine (i.e. high surface area) pigments. Such media requires high levels of dispersant and consequently proportionally lower levels of binder. This has an adverse effect on the physical properties of the media.

In order to overcome such problems, binders having dispersing capacity have been developed. In particular, polar groups, such as, hydroxyl, carboxyl, sulphonic acid, phosphoric acid and the-like have been introduced to improve the binder's affinity towards the magnetic pigment.

There is considerable interest in the use of self-wetting urethanes containing phosphorus based wetting functionality. Generally, no evidence is apparent to suggest that any one type is to be preferred. The phosphorus functionality may also be either pendant to the main polymer chain or an integral part of it. There are surprisingly few examples of phosphonate ester functionality being used. Such functionality is often preferred in conventional, low molecular weight dispersants. Examples of patents which disclose the use of phosphorus chemistry in self-wetting polyurethanes include JP 01-106324A, JP 02-053219A, U.S. Pat. No. 4,612,244, U.S. Pat. No. 4,830,923 and U.S. Pat. No. 4,842,942.

Several patents disclose polyurethanes with hydroxy functionality at sites other than at chain ends. For example, JP 02-012613A describes P functional polyurethanes with tertiary-hydroxy functionality at positions other than chain ends. JP 02-129217A describes thermo-setting polyurethanes for use in magnetic coatings. The polyurethanes of choice comprises mainly a polymer prepared by reacting a diisocyanate, a polydiol compound of a polyester, polyether or polycaprolactone diol, a diol containing a polar functional group selected from various wetting functionality including —(P(O)OM')$_2$ and a compound containing at least three reactive groups selected from —OH, —NH$_2$, or —NH, or a (poly)oxyalklene bisphenol derivative.

However, it is unlikely that a single binder urethane coating would provide all of the essential physical properties required. For example, JP 01-073523A and U.S. Pat. No. 4,837,082 discuss the need to find the correct balance of soft and hard resin components within the cross-linked binder matrix in order to maintain flexibility whilst ensuring that the matrix has the required tensile strength and modulus. The presence of a higher Tg hard resin (compared to the low Tg urethane) also provides for improved thermal stability.

JP 02-129217A which discloses phosphorus containing urethanes, contains no reference to inclusion of hard resin binders, for example vinyl chloride or nitrocellulose materials. Other prior art which claims good dispersivity from the sole use of a self-wetting resin based on phosphorus acid wetting groups can be found in U.S. Pat. No. 5,037,934.

There are several disclosures of the use of binder blends containing self-wetting polymers. These may be divided into three groups; (a) self-wetting polyurethanes with "non-wetting" hard resins, (b) "non-wetting" polyurethanes with self-wetting hard resins and (c) the use of urethanes and hard resin binders which both contain polar wetting functionality.

(a) Examples from this group combine self-wetting urethanes, which may include phosphorus functionality, with commercially available vinyl chloride based resins. JP 02-012613 discloses examples of self-wetting urethanes blended with vinyl chloride/vinyl acetate, vinyl chloride/vinyl propionate, thermoplastic polyurethanes, cellulose polymers, thermoplastic polyesters, epoxy resins, and phenolic resins. In particular, an example is given where the vinyl chloride material is VAGH (Union carbide). There is no reference to vinyl chloride resins containing polar groups. Other examples which use these blended binder materials can be found in JP 3224130A, JP 3224129A, JP 3224128A and U.S. Pat. No. 4,529,661.

(b) U.S. Pat. No. 5,151,330 describes the use of a binder blend which utilises a polyurethane resin containing polycaprolactone units and a self-wetting vinyl chloride resin containing various polar groups including phosphonic and phosphoric acids and salts. Other similar examples include U.S. Pat. No. 5,096,774. The latter describes the use of a vinyl chloride copolymer containing epoxy rings and polar groups. The polar groups listed include SO$_3$M, OSO$_3$M, PO$_3$M$_2$ or CO$_2$M, where M=H, alkali metal or ammonium.

(c) Several patents describe binder blends in which both materials (urethane and hard resin) contain polar groups for pigment dispersing. However, the choice of wetting group is mostly limited to acids and salts comprising either sulphur or phosphorus. For example, JP 3203020 discloses magnetic recording media comprising at least two types of resin selected from vinyl chloride resins, cellulose derivatives, polyurethanes and polyesters such that there is a difference of at least 60° C. between their Tg's, each resin containing a polar group selected from $SO_3M$, COOM, or $PO(OM')_2$ where M=H or alkali metal and M'=H, alkali metal or alkyl group. Other patents in this class include JP 04-003312, 03-041618 and 03-141018 and U.S. Pat. Nos. 4,784,507, 4,784,914, 4,830,923, 5,126,202 and 5,153,079.

The present invention provides a binder system for magnetic media comprising a particular combination of phosphonated polyurethane and vinyl chloride based resin.

BRIEF SUMMARY OF THE INVENTION

According to the present invention there is provided a binder composition suitable for use with magnetic media comprising:

(i) a phosphonated polyurethane having a plurality of units of the formula:

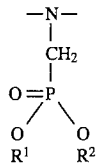

in which:
the nitrogen atom forms part of the backbone chain of the polymer, and
$R^1$ and $R^2$ independently represent an alkyl group, cycloalkyl group, an aryl group or together comprise the necessary carbon atoms to complete a ring, and (ii) a vinyl chloride copolymer having pendant ammonium functionalities.

The invention also provides compositions comprising a binder as described above having magnetic pigment dispersed therein and magnetic recording media comprising a substrate bearing a layer of such a composition.

It has been found that the compositions of the invention provide good quality magnetic coatings. The compositions exhibit good low shear viscosity properties, good stability properties and improved bulk magnetic properties and durability.

DESCRIPTION OF PREFERRED EMBODIMENTS

The weight ratio of (i) to (ii) is generally in the range 10:1 to 1:10, preferably 3:1 to 1:3, more preferably about 1:1.

The phosphonated polyurethane generally has a phosphorus equivalent weight in the range 1000 to 20000, preferably 2000 to 10,000. The polyurethane is hydroxy functional and generally has a hydroxy equivalent weight of from 500 to 10000.

Preferably the phosphonated polyurethane polymer is formed by reaction of the following components:

a) a soft segment diol in which the hydroxy groups are separated by a flexible chain,
b) a hard segment diol in which the hydroxy groups are separated by a relatively inflexible chain,
c) a triol,
d) a diisocyanate and
e) a dialkyl phosphonate of the formula:

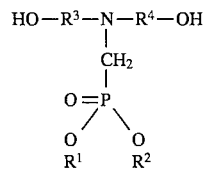

in which:
$R^1$ and $R^2$ are as defined above, and $R^3$ and $R^4$ independently represent divalent linking groups.
$R^1$ and $R^2$ are generally alkyl groups containing 1 to 5 carbon atoms or simple aryl groups containing 6 to 10 carbon atoms. Preferably $R^1$ and $R^2$ are $C_2H_5$.
$R^3$ and $R^4$ generally comprise a carbon chain of up to 6 carbon atoms, preferably $R^3$ and $R^4$ are —$CH_2$—$CH_2$—.

A preferred dialkyl phosphonate is diethyl bis-(2-hydroxyethyl)aminomethyl-phosphonate, is available from AKZO under the trade name Fyrol-6.

The soft segment diol is a diol in which the hydroxy groups are separated by a flexible chain. Examples include Tone 210 (a polycaprolactone diol available from Union Carbide), Desmophen 2020E (a polycarbonate diol available from Bayer) and Ravecarb 106 (a polycarbonate diol available from Enichem). The hard segment diol is a diol in which the hydroxy groups are separated by a relatively inflexible chain, a typical example being 2,2-dimethylpropane-1,3-diol, also known as neopentyl glycol (NPG).

A preferred triol is Tone 305 (a polycaprolactone triol available from Union Carbide).

Typical diisocyanates include toluene diisocyanate, 4,4'-diphenylmethanediisocyanate (MDI) and isophorone diisocyanate (IPDI).

Vinyl chloride copolymers suitable for use in the invention are polymers and copolymers of vinyl chloride having pendant ammonium groups, i.e. the polymer has a plurality of cationic ammonium functionalities covalently bonded thereto. Suitable vinyl chloride resins may be prepared by copolymerisation of vinyl chloride (by standard techniques) with comonomers such as vinyl esters, vinyl ethers, acrylonitrile, vinylidene chloride, maleic acid, maleic anhydride styrene, allyl derivatives etc. At least one of the monomers must possess an ammonium functionality or a group capable of being converted to same. For example, a comonomer may have an amino functionality susceptible to quaternisation by an alkyl halide or similar reagent in a post-polymerisation reaction. Examples of monomers possessing ammonium functionality include allylammonium salts. The identity of the anion associated with the ammonium cation is not critical, but is typically halide such as chloride or bromide.

The vinyl chloride copolymer is preferably a "hard" resin, having a Tg (glass transition temperature) higher than that of the phosphonated polyurethane, and preferably higher than 30° C., most preferably higher than 40° C.

Suitable vinyl chloride resins are available commercially, e.g. resins supplied by Sekisui under the trade name EC130.

Binder compositions of the invention find use in magnetic recording media comprising a substrate and one or more coated layers of dispersed magnetic particles. The binder compositions may form part of the layer(s) of dispersed magnetic particles, or may form part of a non-magnetic coated layer (such as a backcoat providing antistatic properties), or both. However, the presence of the pigment-wetting groups in the binder compositions makes them particularly suitable for use in magnetic particle dispersions.

Magnetic recording media of the present invention comprise a magnetic layer provided on a non-magnetisable substrate. When the media is in the form of a tape, a backside coating is optionally provided on the opposite side of the substrate. The particular non-magnetisable substrate of the present invention can be formed from any suitable substrate material known in the art. Examples of suitable substrate materials include, for example, polymers such as polyethylene terephthalate ("PET"), polyimide, and polyethylene, naphthenate ("PEN"), metals such as aluminum, or copper, paper, or any other suitable material.

The components of a magnetic layer comprise a magnetic pigment dispersed in a polymeric binder. Typically, the magnetic layer can contain 100 parts by weight of the magnetic pigment and 5 to 40 parts by weight of the polymeric binder. The type of magnetic pigment used in the present invention can include any suitable magnetic pigment known in the art including $\gamma$-$Fe_2O_3$, cobalt-doped $\gamma$-$Fe_2O_3$, $Fe_3O_4$, $CrO_2$, barium ferrite, barium ferrite derivatives, metal particles, and the like.

In addition to the binder composition of the invention and the magnetic pigment, the magnetic layer of the present invention can also comprise one or more conventional additives such as lubricants; abrasives; crosslinking agents; head cleaning agents; thermal stabilisers; antioxidants; dispersants; wetting agents; antistatic agents; fungicides; bactericides; surfactants; coating aids; non-magnetic pigments; and the like in accordance with practices known in the art.

Backside coatings for magnetic recording media can be prepared by the incorporation of non-magnetic pigment dispersed in the polymeric binder system of the present invention. The backside coating can be prepared by coating an uncured polymeric binder system as described herein, onto a non-magnetic substrate. The system is then dried and cured using techniques within the skill of those in the art, to provide a tough, durable backside coating.

Non-magnetic pigments useful for the preparation of backside coatings include, for example, carbon black, $Al_2O_3$, $TiO_2$ and the like. The amount of pigment can vary, but is preferably within the range from about 30 to 55 parts by weight and most preferably within the range from about 40 to 50 parts by weight, based on 100 parts (dried weight) backside coating.

In addition to the binder system of the invention and the non-magnetic pigment, the backside coating of the present invention may also comprise one of more conventional additives such as lubricants; abrasives; crosslinking agents; head cleaning agents; thermal stabilisers; antioxidants; dispersants; wetting agents; antistatic agents; fungicides; bactericides; surfactants; coating aids; and the like in accordance with practices known in the art.

As one example of a process for preparing a magnetic recording medium, the components of the magnetic layer or the backside coating are combined and mixed with a suitable solvent to form a substantially homogeneous dispersion. The dispersion is then coated onto a non-magnetisable substrate, which can be primed or unprimed. The dispersion can be applied to the substrate using any conventional coating technique, such as gravure or knife coating techniques. The coated substrate can then be passed through a magnetic field to orient the magnetic pigment after which the coating is dried, calendered if desired, and then allowed to cure.

Curing can be accomplished in a variety of ways. As one approach, an isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxyl groups of the polymeric binder. Preferably, a catalyst, e.g. dibutyltin dilaurate, can also be added in suitable catalytic amounts in order to facilitate this crosslinking reaction. Generally, using from 0.02 to 0.2 parts by weight of catalyst per 100 parts by weight of magnetic pigment is preferred.

The isocyanate crosslinking agent, if any, is a polyfunctional isocyanate having an average functionality of at least 2 isocyanate groups per molecule. Examples of specific polyfunctional isocyanate useful as the isocyanate crosslinking agent in the practice of the present invention include materials commercially available as MONDUR CB-601, CB-75, CB-701, MONDUR-MRS from Miles, Inc.; DESMODUR L available from Bayer A.G.; CORONATE L available from Nippon Polyurethane Ind., Ltd.; and PAPI available from Union Carbide Corp.

The isocyanate crosslinking agent is preferably used in an amount such that the molar ratio of NCO groups from the isocyanate crosslinking agent to the total number of hydroxy groups from the hydroxy functional polymer is greater than 0. Preferably, the molar ratio of the NCO groups from the isocyanate crosslinking agent to the total number of hydroxy groups from the hydroxy functional polymer is in the range from about 1 to 1, to about 2 to 1, or more preferably from about 1.2 to about 1.5 to 1.

As another approach, when one or more components of the polymeric binder contain radiation curable moieties, the dried coating can be irradiated to achieve curing of the radiation curable materials. Those skilled in the art, given the present teaching, will appreciate the manner in which irradiation can be achieved using any type of ionising radiation that is capable of penetrating the pigment, e.g., electron beam radiation. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 keV, preferably 200 to 250 keV.

Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising nitrogen or a noble gas and having an oxygen content of less than 500 parts per million ("ppm"). A preferred inert atmosphere is a nitrogen atmosphere having an oxygen content of less than 75 parts per million.

The invention will now be illustrated by the following Examples, in which the following abbreviations are used:

Squareness: The ratio of the magnetic flux remaining after the removal of an applied magnetic field, to the magnetic flux present at an applied saturating magnetic field (typically 3000 or 10000 Oe). This is a bulk magnetic property that allows prediction of read/write performance, and values can vary from 0.5 (randomly oriented particles) to a theoretical maximum of 1.0 (perfectly oriented particles).

B/H Meter and VSM (vibrating sample magnetometer): Alternative methods for measuring squareness. Both methods are equally valid, but may give slightly different results for a given sample owing to hysteresis effects. (See "The Complete Handbook of Magnetic Recording", 3rd edition, ed. F. Jorgensen, Tab Books, U.S.A., 1988).

Stop-motion: A test for durability of video tape in which a rotating head is run on tape locked in the pause mode of a video recorder for a fixed length of time.

Br (Residual magnetisation): A measure of the magnetic field that remains when the applied field is reduced to zero. High values are good.

Gloss: Gloss or specular reflectance is a surface property of the material, governed by the refractive index and surface roughness. High values of gloss usually indicate well dispersed pigment coatings.

ips: inches per second.

kfc/i: kilo flux changes per inch.

MEK: Methyl ethyl ketone

CHO: Cyclohexanone

TOL: Toluene

EXAMPLE 1

Synthesis of Polyurethane (1)

A solution of 2,2-dimethyl-1,3-propane diol (NPG) (9.0 g, 0.173 OH equiv), Tone 210 (32.45 g, 0.079 OH equiv), diethyl (bis-2-(hydroxyethyl)amino methyl phosphonate, (2.55 g, 0.01M, 0.02 OH equiv), dibutyl tin dilaurate (0.05 g) in MEK (150 g+30 ml) was refluxed under argon and 30 ml of solvent distilled out of the reaction flask to dry the reactants. The solution was cooled to approximately 40° C. and isophorone diisocyanate (36.0 g, 0.32 NCO equiv) added in one portion. After 10 minutes the solution was refluxed for 2 hours. Tone 305 (20 g, 0.11 OH equiv) was then added and the reflux continued until no residual NCO could be detected by IR. The solution was stood at room temperature overnight, intrinsic viscosity of the polymer was determined to be 0.25. The solution was warmed to 60° C. and isophorone diisocyanate (0.86 g, 0.008 NCO equiv were added and the solution stirred at that temperature until no residual NCO could be detected. Intrinsic viscosity of the polymer was determined to be 0.30. The calculated phosphorus equivalent weight of the polymer was 10,000. Final NCO/OH ratio was calculated at 0.86.

Synthesis of Polyurethane (13)

A solution of 2,2-dimethyl-1,3-propane diol (1.5 g, 0.029 OH equiv), Tone 210 (41.4 g, 0.100 OH equiv—added as 40% solution in MEK (103.5 g), Fyrol-6 (6.4 g, 0.025M, 0.050 OH equiv) and dibutyl tin dilaurate (0.10 g) in MEK (37 g +30 ml) was refluxed under argon and 30 ml of solvent distilled off to dry the combined diols. The solution was cooled at 65° C. and a solution of diphenyl methane diisocyanate (30.74 g, 0.246 NCO equiv) in MEK (31 g) was added in one portion. The solution was stirred at an oil bath temperature or 65° C. for two hours before adding a solution of Tone 305 (20.0 g, 0.110 OH equiv) in MEK (20 g). The mixture was allowed to react at the same temperature until no residual isocyanate could be detected. The intrinsic viscosity of the resultant polyurethane was determined to be 0.26. The calculated phosphorus equivalent weight of the polymer was 4000, and final NCO/OH ratio calculated to be 0.85.

Polyurethanes reported in the following Table 1 were prepared in an analogous manner.

Representative Formulation

A mixture of cobalt modified iron oxide with a surface area of 48–52 $m^2/g$ (25 g), a polyurethane synthesised as described above (18.4 g of 45.3% solids solution) and MEK (52 g) were placed in a sealed steel canister. 1.0–0.8mm zirconia milling media (100 g) were added and the mill agitated on a paint shaker for a total of 8 hrs. The resultant dispersion had a calculated oxide loading of 75%, and a final % of solids of 35%. The ICI viscosity of the dispersion was 24 cps, and the surface gloss of a handspread 40. Viscosity was measured by an ICI cone and plate type apparatus, Research Equipment (London) Ltd., shear rate $10,000^{-1}$ [Squareness measurements were made on B/H meter (3,000 Oe) and VSM (10,000 OE).]

Table (1) reports the polyurethanes prepared and properties of formulations containing same.

TABLE 1

| Polyurethane No. | P Equivalent Wt ($\times 10^3$) | Diisocyanate | % NPG | NCO/OH ratio | 45° Gloss | Squareness B/H | Squareness VSM |
|---|---|---|---|---|---|---|---|
| (1) | 10 | IPDI | 9 | 0.87 | 40 | 0.72 | — |
| (2) | 5 | IPDI | 9 | 0.87 | 42 | 0.74 | — |
| (3) | 10 | MDI | 9 | 0.87 | 23 | 0.72 | — |
| (4) | 5 | MDI | 9 | 0.80 | 47 | 0.74 | — |
| (5) | 2 | MDI | 9 | 0.80 | 63 | 0.70 | 0.65 |
| (6) | 1.5 | MDI | 9 | 0.80 | 61 | — | 0.63 |
| (7) | 3.5 | MDI | 9 | 0.80 | 54 | — | 0.68 |
| (8) | 2 | MDI | 1.5 | 0.85 | 65 | — | 0.68 |
| (9) | 2 | MDI | 7.5 | 0.85 | 60 | — | 0.67 |
| (10) | 2 | MDI | 4.5 | 0.825 | 63 | — | 0.69 |
| (11) | 4 | MDI | 4.5 | 0.85 | 57 | — | 0.70 |
| (12) | 4 | MDI | 7.5 | 0.85 | 49 | — | 0.67 |
| (13) | 4 | MDI | 1.5 | 0.85 | 52 | — | 0.72 |
| (14) | 4 | MDI | 4.5 | 0.825 | 61 | 0.77 | — |
| (15) | 4 | MDI | 1.5 | 0.80 | 56 | — | 0.68 |
| (16) | 4 | MDI | 7.5 | 0.80 | 61 | 0.76 | — |

The results reported in Table 1 demonstrate that polyurethanes (1) to (16) which contain the amino methyl phosphonate functionality dispersed the pigment well.

For comparison, the following polyurethanes were tested in formulations as described above:

(17) Polyurethane (17) was prepared as for polyurethane (3), but without the phosphonate component.

(18) Polyurethane (18) was prepared as for polyurethane (1) except that 4-(bis-2-hydroxyethylamine) benzyl phosphonate was used instead of the phosphonate derivative of the invention.

(19) Polyurethane (19) is an N-methylamine functional polymer, prepared by a similar method, using N-methyl diethanolamine.

(20) Polyurethane (20) is Sanyo TI 7503 a carboxylate containing polyurethane functional polymer, commercially available from Sanyo.

TABLE 2

| Polyurethane | Phos. Eq. (× 10⁻³) | NCO | %-NPG | NCO/OH | Gloss |
|---|---|---|---|---|---|
| (17) | 0 | MDI | 9 | 0.83 | 3 |
| (18) | 10 | IPDP | 9 | 0.80 | 2 |
| (19) | 0 | MDI | 6 | 0.80 | 1 |
| (20) | 0 | | | | 5 |

Table 2 reports comparative data for 4 different dispersions containing the individual polyurethanes (17)– (20). The quality of the dispersions made with each of these urethanes was poor, with gloss values not exceeding 5.

Polyurethane (17) synthesised as per Example 1 without any phosphonate wetting functionality was not able to disperse the pigment when milled under the same conditions as for data in Table 1. This proves that the phosphonate wetting functionality introduced into the polyurethane is an effective dispersing group.

Polyurethanes (18) and (19) were also milled for comparison. The data in Table 2 indicates that polymers containing amino ethyl phosphonate functionality reported in Table 1, easily out perform comparative polyurethanes (18) and (19). This implies that the presence of the amino methyl phosphonate (N—C—P) molecular sequence is critical to the wetting performance of the urethane. Inserting a benzyl group between the nitrogen and phosphorous atoms greatly reduces the wetting efficiency of the molecule.

Finally a comparison was made with a commercially available self-wetting polyurethane, TI7503 (SANYO). Poor values of gloss were obtained from a dispersion containing this material. In fact, even though the dispersion % solids were identical for all comparative examples (e.g. 35%), the dispersion viscosity (ICI) was too high for efficient milling. Values of ICI viscosity of greater than 150 cps were obtained.

EXAMPLE 2

Synthesis of Polyurethane (21)

Desmophen 2020E (67.06 g, 0.067 OH equiv), 2,2-dimethyl- 1,3-propane diol (18.0 g, 0.346 OH equiv) and Fyrol-6 (commercially available from AKZO) (5.10 g, 0.02M, 0.04 OH equiv) were dissolved in toluene (200 g) and the toluene distilled off to azeotrope any water present. The dry mixture was dissolved in MEK (190 g), dibutyl tin dilaurate (DBTDL) (0.10 g) was added and the solution stirred under nitrogen at 65° C. whilst a solution of MDI (63.19 g, 0.506 NCO equiv) in MEK (60 g) was added. The reaction was allowed to proceed at the same temperature for 2 hours, before a solution of Tone 305 (40.0 g, 0.220 OH equiv) in MEK was added. When no residual isocyanate could be detected (approx 30 min after addition) a further aliquot of MDI (6.65 g, 0.053 NCO equiv) in MEK (10 g) was added. The reaction was again allowed to proceed until no residual isocyanate could be detected. The resultant polymer had a calculated phosphorus equivalent weight of 10,000, and a final NCO/OH ratio of 0.83.

Binders comprising phosphonate containing polyurethane (21) in combination with commercially available hard resins, MR120 (a sulphonated vinyl resin manufactured by Nippon Zeon), EC130 (a vinyl chloride resin with pendant ammonium chloride groups manufactured by Sekisui) and MXR 535 (a vinyl chloride, vinyl acetate hydroxy modified copolymer containing sulphonate functionality, manufactured by Union Carbide) were evaluated.

Preparation of phosphonate polyurethane/EC130 containing dispersion.

Cobalt modified iron-oxide pigment used in Example 1 (150 g) and Reynolds alumina (10.5 g) were added portion wise to a stirred solution of a polyurethane (21) (34.0 g of 40% solids solution), EC130 (14.0 g), myristic acid (3.0 g), butyl myristate (1.5 g), MEK (153 g), toluene (58 g) and cyclohexanone (58 g). After the addition was complete the whole was subjected to high shear mixing for 2 hours. The premix was then transferred to the hopper of a Dispermat SL 603 horizontal bead mill, and milled with zirconia media until smooth (constant gloss). The % solids of a dispersion was adjusted to 40% by the addition of MEK. Evaluation data for this dispersion are recorded in Table 3.

TABLE 3

| Binder | P Equiv Wt | Binder ratio | Hard resin | Gloss (45°) | Squareness (B/H meter) | Viscosity (cps) Low Shear | High Shear |
|---|---|---|---|---|---|---|---|
| (21) | 10k | (1:1) | MXR535 | 58 | 0.81 | >20,000 | — |
| (21) | 10k | (1:1) | MR120 | 46 | 0.80 | >10,000 | 37 |
| (21) | 10k | (1:1) | EC130 | 62 | 0.82 | <5,000 | 45 |
| (S)* | | (1:1) | MR120 | 55 | 0.78 | <5,000 | 38 |
| (S)* | | (1:1) | EC130 | 64 | 0.77 | | 48 |

*Comparative polyurethane (S) comprises a sulphonated hydroxy-functional polymer as disclosed in U.S. Pat. No. 5071578.

The data in Table 3 demonstrates that all of the above binder combinations disperse magnetic pigment and produce smooth coatings (high gloss) with good pigment dispersivity. Comparison of phosphonate/EC130 binder blend of the invention with the binder composition described in U.S. Pat. No. 5,069,807, shows that slightly higher values of squareness were obtained for the phosphonate polyurethane/EC130 blend.

Dispersions containing phosphonate polyurethane (21) blended with different hard resins were also examined for low-shear viscosity measured on a Viscometers (UK) Ltd viscometer (spindle 13). The use of either MR120 OR MXR535 gave dispersions with unacceptably high low-shear viscosity. By comparison, dispersions formed with the polyurethane (21)/EC130 of the invention blend exhibited low low-shear viscosity thereby showing distinct advantage over other hard resins.

Dispersions containing the following blended binders phosphonate polyurethane (21)/EC130 and sulphonate polyurethane(s)/EG130 were further examined for stability after 7 days. The resultant values of gloss, squareness and ICI (high shear) viscosity are presented in Table 4.

TABLE 4

| Urethane/Hard | Gloss | | Squareness | | Viscosity ICI | |
|---|---|---|---|---|---|---|
| resin (ratio) | 0 days | +7 days | 0 days | +7 days | 0 days | +7 days |
| (21) (1:1) EC130 | 62 | 67 | 0.82 | 0.81 | 45 | 44 |
| (S) (1:1) EC130 | 64 | 47 | 0.77 | 0.72 | 48 | 50 |

The data clearly shows that the phosphonate polyurethane/EC130 formulation of the invention is stable over this time period. However, over the corresponding time period the stability of the sulphonate polyurethane/EC130 binder by comparison is very poor. Both gloss and squareness fall off with time which strongly suggests that particle agglomeration has taken place.

EXAMPLE 3

Coated Media

Magnetic dispersions utilising phosphonate polyurethanes (21) and 13) in combination with hard resin EC130, were prepared using a similar procedure to Example 2 but instead the formulation, based on pigment weight, was scaled-up from 150 g (Cobalt modified iron oxide pigment as in Example 1) to 8250 g. The scaled-up dispersions, were coated alongside the binder formulation disclosed in U.S. Pat. No. 5,071,578 and in U.S. Pat. No. 5,069,807. Additions of myristic acid and butyl stearate were made to the filtered dispersions. Prior to coating, an isocyanate activator, CB601 (Modur) was added (13 g/lb dispersion) (28.7 g/Kg).

The resulting dispersion was applied to one major surface (front side) of a polyethylene terephthalate film (thickness: 9 μm) by means of gravure coating (thickness 90.96 micro inches). The other major surface of the polyethylene terephthalate film (back side) had a back-coat (58–70 micro inches) comprising carbon black, aluminium oxide, and binders, which back-coat has been coated on the polyethyleneterephthalate film by means of gravure coating before the magnetizable dispersion had been coated on the front side.

The back-coat had been prepared in the following manner. Carbon black (100 part of weight, particle size of 42 nm, specific surface area of 80 m²/g), aluminium oxide (9 parts by weight), a dispersant (5 parts by weight, a phosphorylated polyol/quarternary ammonium salt mixture), phenoxy resin (58 parts by weight, PKHH Union Carbide Co.), and polyurethane (88 parts by weight, "Estane 5705, B. F. Goodrich Co.) were dispersed in tetrahydrofuran (1473 parts by weight) in a 22 liter horizontal sandmill by means of glass media. Polyisocyanate (34 parts by weight, "Modur" CB-601) was added to the dispersion prior to coating.

The resultant coated film was allowed to stand in a parallel magnetic field of 3000 gauss for 0.1 second and then dried through a dryer at a temperature of 60° C. The resultant dried coating was calendered, and the magnetic layer obtained had a thickness of about 2.5 microns. The resulting calendered coating was wound (total coating length of each tape amounted to 3000 ft) and slit to a tape width of 6.35 mm.

The properties of the resulting media are reported in Table 5.

TABLE 5

| Polyurethane Resin | Hard Resin | Gloss | Br | Squareness |
|---|---|---|---|---|
| (21) 1:1 | EC130 | 113 | 1501 | 0.86 |
| (21) 35:65 | EC130 | 116 | 1504 | 0.85 |
| (13) 1:1 | EC130 | 118 | 1698 | 0.86 |
| Polyurethane/Hard resin Blend (S)* | | 115 | 1327 | 0.81 |

*Comparative polyurethane/hard resin blend (S) as described in U.S. Pat. No. 5069807.

Gloss values for all four coated tape examples are similar, indicating good quality, smooth magnetic tape. Bulk properties Br (a measure of remanence magnetisation of a coating after external field is removed, which will be related to magnetic output) and squareness were also measured. Table 5 clearly shows that the phosphonate polyurethane containing binder combination of the invention offers an advantageous increase in both Br and squareness.

The data presented in Table 5 is obtained from two different polyurethanes, namely (21) and (13). The major difference between the two materials is the wetting group content. Polyurethane (21) contains wetting functionality at the level of 10k phosphorus equivalent weight, whereas, (13) contains a phosphorus equivalent weight of 4k. The data presented shows that good quality dispersions is not restricted to a particular wetting group content level, but will perform over a wide range of wetting group equivalent weight.

Media Lifetime Test

Coated samples as produced above were subjected to wear-durability tests in a data cartridge drive. During the test 10 m of tape is shuffled at 120 ips and tested every 50k passes at 45 kfci until it fails. Tape samples of phosphonate polyurethanes (21) and (13) and the binder formulation cited in U.S. Pat. No. 5,069,807, were tested. Tape samples coated using the phosphonate polyurethane/EC130 binder system of the invention exceeded 250k passes, whereas the tape containing polymer blend (7) failed at this level (250k). This demonstrates that the phosphonate/EC130 binder system of the invention offers better durability than the binder system described in U.S. Pat. No. 5,069,807.

EXAMPLE 4

Dispersions with Alternative Pigments

The usefulness of this invention (phosphonate urethane/EC130 blend) was further demonstrated with a different pigment type, namely barium ferrite. Barium ferrite pigment, a potential material for high density applications, was selected due to its distinct differences (both chemically and magnetically) to more conventional pigments, such as, cobalt modified iron oxides.

A phosphonate urethane binder (22) was prepared in a similar manner to polyurethane (21) with the phosphorus equivalent weight set at 5,000. Two dispersions were prepared using a 4-liter Netzsch mill with 1 mm Yttrium media. Each dispersion contained a different polyurethane (22) EC130 blend, namely 3:7 (see below) and 1:1 respectively.

| | |
|---|---|
| Pigment — Barium Ferrite pigment (surface area 50–55 m²/g) | 8000 g |

-continued

| | |
|---|---|
| EC130 (20% solids in MEK) | 2295 g |
| Polyurethane (22) (38% solids in MEK) | 1208 g |
| Myristic acid | 200 g |
| Butyl myristate | 80 g |
| MEK | 4789 g |
| Toluene | 2463 g |
| CHO | 2469 g |

Dispersions were coated onto 13 micron polyester base and evaluated for bulk magnetics, surface roughness and for stop motion. Table 6 shows the values obtained.

TABLE 6

| Property | | Polyurethane (22)/EC130 1:1 | Polyurethane (21)/EC130 3:7 |
|---|---|---|---|
| Bulk Magnetics | Coercivity | 1486 | 1466 |
| | Squareness | 0.857 | 0.856 |
| Surface Roughness | Rq (nm) | 4.95 | 6.11 |
| Stop Motion | (hrs) | 22 | 22 |

The above data demonstrates that good quality magnetic coatings can be made using a phosphonate urethane/EC130 binder blend of the invention with both barium ferrite as well as iron oxide pigments.

We claim:

1. A magnetic recording medium comprising a substrate bearing a binder composition having magnetic pigment dispersed therein wherein said binder composition comprises:

(i) a phosphonated polyurethane having a plurality of units of the formula:

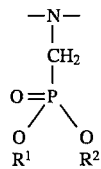

wherein:
the nitrogen atom forms part of the backbone chain of the polymer, and
$R^1$ and $R^2$ independently represent members selected from the group consisting of alkyl groups of 1 to 5 carbon atoms, cycloalkyl groups and aryl groups of 6 to 10 carbon atoms or together $R^1$ and $R^2$ comprise the necessary carbon atoms to complete a ring, and (ii) a vinyl chloride copolymer having pendant ammonium functionalities.

2. A magnetic recording medium according to claim 1 wherein said magnetic pigment is a member selected from the group consisting of $\gamma\text{-}Fe_2O_3$, cobalt-doped $\gamma\text{-}Fe_2O_3$, $Fe_3O_4$, $CrO_2$, barium ferrite, barium ferrite derivative, and metal particle magnetic pigment.

3. A binder composition suitable for use with magnetic media comprising:

(i) a phosphonated polyurethane having a plurality of units of the formula:

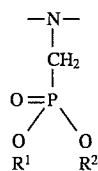

wherein:
the nitrogen atom forms part of the backbone chain of the polymer, and
$R^1$ and $R^2$ independently represent members selected from the group consisting of alkyl groups of 1 to 5 carbon atoms, cycloalkyl groups and aryl groups of 6 to 10 carbon atoms or together $R^1$ and $R^2$ comprise the necessary carbon atoms to complete a ring, and (ii) a vinyl chloride copolymer having pendant ammonium functionalities.

4. A binder composition according to claim 3 in wherein the weight ratio of (i):(ii) is the range 10:1 to 1:10.

5. A binder composition according to claim 4 wherein the weight ratio of (i):(ii) is in the range 3:1 to 1:3.

6. A binder composition according to claim 3 wherein said phosphonated polyurethane has a phosphorus equivalent weight of from 1000 to 20,000.

7. A binder composition according to claim 3 wherein the phosphonated polyurethane polymer has a plurality of hydroxy groups such that said phosphonated polyurethane polymer has a hydroxyl equivalent weight in the range 500 to 10,000.

8. A binder composition according to claim 3 wherein said phosphonated polyurethane polymer is formed by reaction of the following components:

a) a soft segment diol in which the hydroxy groups are separated by a flexible chain,
b) a hard segment diol in which the hydroxy groups are separated by a relatively inflexible chain,
c) a triol,
d) a diisocyanate and
e) a dialkyl phosphonate of the formula:

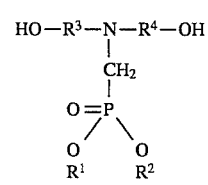

wherein:
$R^1$ and $R^2$ independently represent members selected from the group consisting of alkyl groups of 1 to 5 carbon atoms, cycloalkyl groups and aryl groups of 6 to 10 carbon atoms or together $R^1$ and $R^2$ comprise the necessary carbon atoms to complete a ring, and
$R^3$ and $R^4$ independently represent divalent linking groups.

9. A binder composition according to claim 8 wherein said soft segment diol is a member selected from the group consisting of a polycaprolactone diol and a polycarbonate diol.

10. A binder composition according to claim 8 wherein said hard segment diol is 2,2-dimethyl propane-1,3-diol.

11. A binder composition according to claim 8 wherein said triol is a polycaprolactone triol.

12. A binder composition according to claim 8 wherein said diisocyanate is a member selected from the group consistsing of 4,4,-diphenylmethanediisocyanate and isophorone diisocyanate.

13. A binder composition according to claim 8 wherein $R^3$ and $R^4$ are —$CH_2CH_2$— and $R^1$ and $R^2$ are $C_2H_5$.

14. A binder composition according to claim 8 wherein said components are present to provide an NCO/OH ratio in the range 0.75 to 0.90.

15. A binder composition according to claim 8 wherein said soft segment diol is a member selected from the group consisting of a polycaprolactone diol and a polycarbonate diol, said hard segment diol is 2,2-dimethyl propane-1,3-diol, said triol is a polycaprolactone triol, said diisocyanate is a member selected from the group consistsing of 4,4,-diphenylmethanediisocyanate and isophorone diisocyanate and $R^3$ and $R^4$ are —$CH_2CH_2$— and $R^1$ and $R^2$ are $C_2H_5$.

16. A composition according to claim 3 additionally comprising a magnetic pigment dispersed therein.

17. A composition according to claim 16 wherein said magnetic pigment is a member selected from the group consisting of $\gamma\text{-}Fe_2O_3$, cobalt-doped $\gamma\text{-}Fe_2O_3$, $Fe_3O_4$, $CrO_2$, barium ferrite, barium ferrite derivative, and metal particle magnetic pigment.

* * * * *